US012632162B2

(12) United States Patent
Nie et al.

(10) Patent No.: US 12,632,162 B2
(45) Date of Patent: May 19, 2026

(54) DATA ASSOCIATION METHOD AND APPARATUS, COMPUTER DEVICE AND STORAGE MEDIUM

(71) Applicant: Beijing Zitiao Network Technology Co., Ltd., Beijing (CN)

(72) Inventors: Huijing Nie, Beijing (CN); Yifan Tan, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 215 days.

(21) Appl. No.: 18/512,616

(22) Filed: Nov. 17, 2023

(65) Prior Publication Data

US 2024/0169157 A1 May 23, 2024

(30) Foreign Application Priority Data

Nov. 18, 2022 (CN) .......................... 202211447297.7

(51) Int. Cl.
*G06F 3/04842* (2022.01)

(52) U.S. Cl.
CPC ................................. *G06F 3/04842* (2013.01)

(58) Field of Classification Search
CPC .. G06F 3/04842; G06F 3/0481; G06F 3/0482; G06F 40/30; G06Q 50/01
See application file for complete search history.

(56) References Cited

U.S. PATENT DOCUMENTS

| | | | | |
|---|---|---|---|---|
| 6,963,848 B1* | 11/2005 | Brinkerhoff | ....... | G06Q 30/0236 705/14.34 |
| 10,922,340 B1* | 2/2021 | Yu | ......................... | G06F 40/279 |
| 2015/0178304 A1* | 6/2015 | Gross | ................ | G06F 16/24578 707/732 |

FOREIGN PATENT DOCUMENTS

| | | | |
|---|---|---|---|
| CN | 104853253 A | | 8/2015 |
| CN | 107783703 | * | 3/2018 |
| CN | 107783703 A | | 3/2018 |
| CN | 110569334 A | | 12/2019 |
| CN | 111783468 A | | 10/2020 |

OTHER PUBLICATIONS

First Office Action for Chinese Application No. 202211447297.7, mailed on Dec. 5, 2024, 12 pages.

* cited by examiner

*Primary Examiner* — Cao H Nguyen

(57) ABSTRACT

The present disclosure provides a data association method and apparatus, a computer device and a storage medium, wherein the method comprises: in response to a review operation, receiving book review information of a target book; upon determining that the book review information satisfies a data association requirement, obtaining a book topic associated with the target book; wherein a topic content of the book topic includes information matching the book review information and/or a book attribute feature of the target book; and determining topic reply information of the book topic based on the book review information.

20 Claims, 4 Drawing Sheets in response to a review operation, receiving book review information of a target book

S101 upon determining that the book review information satisfies a data association requirement, obtaining a book topic associated with the target book; wherein topic content of the book topic includes information matching the book review information and/or a book attribute feature of the target book

S103 determining topic reply information of the book topic based on the book review information

S105

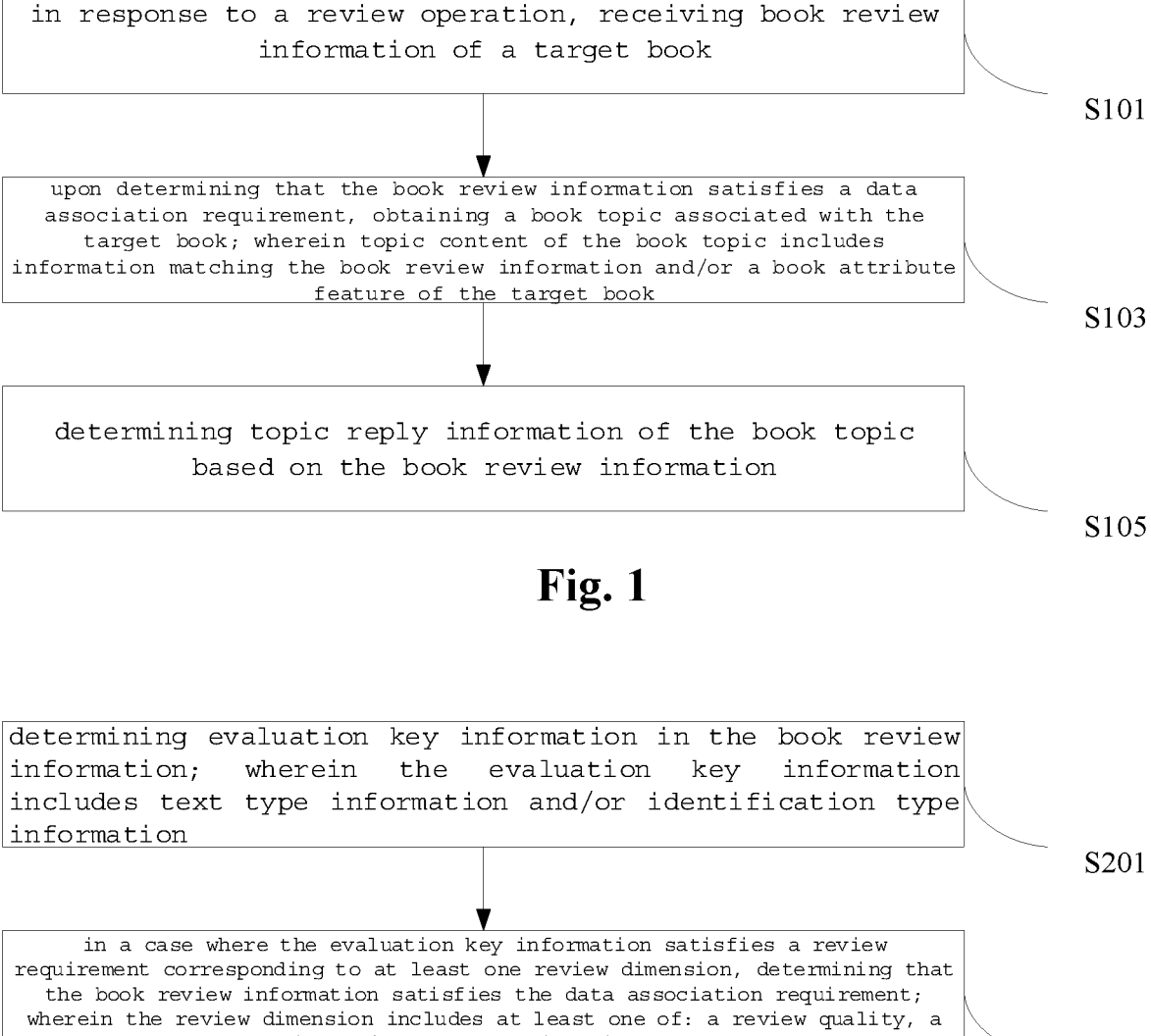

in response to a review operation, receiving book review information of a target book

S101 upon determining that the book review information satisfies a data association requirement, obtaining a book topic associated with the target book; wherein topic content of the book topic includes information matching the book review information and/or a book attribute feature of the target book

S103 determining topic reply information of the book topic based on the book review information

S105

Fig. 1 determining evaluation key information in the book review information; wherein the evaluation key information includes text type information and/or identification type information

S201 in a case where the evaluation key information satisfies a review requirement corresponding to at least one review dimension, determining that the book review information satisfies the data association requirement; wherein the review dimension includes at least one of: a review quality, a review object and a review view count

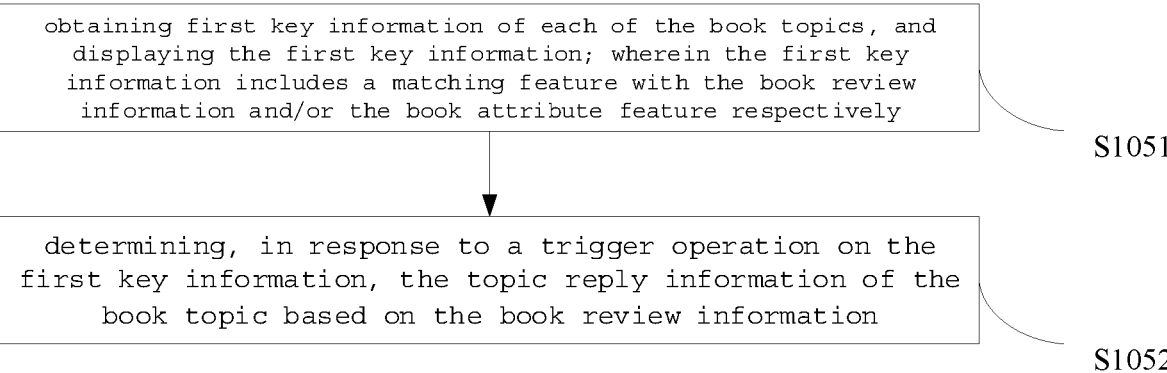

obtaining first key information of each of the book topics, and displaying the first key information; wherein the first key information includes a matching feature with the book review information and/or the book attribute feature respectively

S1051 determining, in response to a trigger operation on the first key information, the topic reply information of the book topic based on the book review information

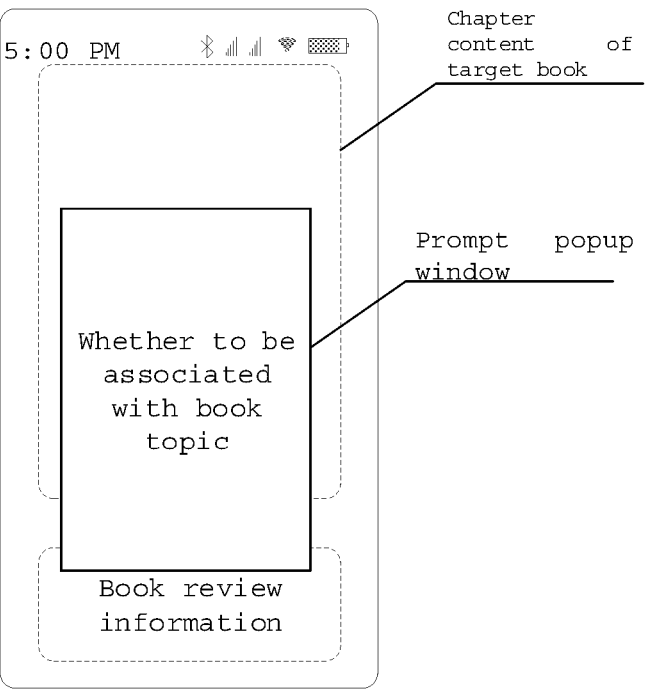

5:00 PM

Chapter content of target book

Prompt popup window

Whether to be associated with book topic

Book review information

Fig. 4

Account
avatar

Reply
area

Computer
device 800

82

81

Processor

Memory
Internal
memory 821
External
memory 822

Bus 83

DATA ASSOCIATION METHOD AND APPARATUS, COMPUTER DEVICE AND STORAGE MEDIUM

This application claims the benefit of priority to Chinese Application No. 202211447297.7, filed Nov. 18, 2022, the entire contents of which are incorporated herein by reference.

TECHNICAL FIELD

The present disclosure relates to the field of computer technology, and in particular, to a data association method and apparatus, a computer device, and a storage medium.

BACKGROUND

In existing online reading applications, a topic posting function is usually provided, through which users can post corresponding book topics to implement communication between the users through the book topics, for example, book recommendation topics. For a book topic newly posted by a user, the number of replies to it is usually small, which results in that the user who posted the book topic cannot get aware of relevant content in a timely manner, which degrades the user's experience of using a review function in the applications. Meanwhile, it is also unfavorable for the exchange and communication between the user who posted the book topic and other users.

SUMMARY

Embodiments of the present disclosure at least provide a data association method and apparatus, a computer device and a storage medium.

In a first aspect, the embodiments of the present disclosure provide a data association method, comprising: in response to a review operation, receiving book review information of a target book; upon determining that the book review information satisfies a data association requirement, obtaining a book topic associated with the target book; wherein topic content of the book topic includes information matching the book review information and/or a book attribute feature of the target book; and determining topic reply information of the book topic based on the book review information.

In an optional embodiment, the determining that the book review information satisfies a data association requirement comprises: determining evaluation key information in the book review information; wherein the evaluation key information includes text type information and/or identification type information; in a case where the evaluation key information satisfies a review requirement corresponding to at least one review dimension, determining that the book review information satisfies the data association requirement; wherein the review dimension includes at least one of: a review quality, a review object and a review view count.

In an optional embodiment, the determining topic reply information of the book topic based on the book review information comprises: obtaining first key information of each of the book topics, and displaying the first key information; wherein the first key information includes a matching feature with the book review information and/or the book attribute feature respectively; determining, in response to a trigger operation on the first key information, the topic reply information of the book topic based on the book review information.

In an optional embodiment, the determining, in response to a trigger operation on the first key information, the topic reply information of the book topic based on the book review information comprises: in response to a click operation on the first key information, displaying a topic reply page of the book topic, and displaying the book review information in a reply area of the topic reply page; and determining, in response to a confirm operation on the book review information, the book review information as the topic reply information of the target book topic.

In an optional embodiment, the method further comprises: in response to a trigger operation on a list identification on a target display page, obtaining a target topic list; wherein the target display page is a page displaying the first key information, and the book topic is part of book topics in the target topic list; and displaying the target topic list on the target display page.

In an optional embodiment, the determining topic reply information of the book topic based on the book review information comprises: in a case where the number of the book topics is multiple, obtaining topic popularity information of each of the book topics; determining a book topic that satisfies a reply requirement among the multiple book topics based on the topic popularity information, and determining topic reply information for the book topic that satisfies the reply requirement based on the book review information.

In an optional embodiment, the method further comprises determining the book topic by: extracting second key information from topic related information of a candidate recommended topic, the second key information being used to indicate a book attribute feature of a book associated with the candidate recommended topic; determining second key information matching the book attribute feature and/or a review feature of the book review information, the review feature including a feature corresponding to at least one book attribute dimension; and determining the book topic based on a candidate recommended topic corresponding to the matching second key information.

In an optional embodiment, the book review information includes a book review position of the target book; the determining the book topic based on a candidate recommended topic corresponding to the matching second key information comprises: determining at least one target candidate recommended topic among the candidate recommended topics corresponding to the matching second key information; wherein a book associated with each of the target candidate recommended topics matches the target book; determining position key information in second key information of the target candidate recommended topic; wherein the position key information is used to indicate a recommended chapter of a book associated with the target candidate recommended topic; and determining, as the book topic, the target candidate recommended topic corresponding to the position key information that matches the book review position.

In a second aspect, the embodiments of the present disclosure provide a data association apparatus, comprising: a receiving unit used for receiving book review information of a target book in response to a review operation; an obtaining unit for obtaining a book topic associated with the target book upon determining that the book review information satisfies a data association requirement; wherein topic content of the book topic includes information matching the book review information and/or a book attribute feature of the target book; and a determining unit for determining topic reply information of the book topic based on the book review information.

In a third aspect, the embodiments of the present disclosure further provide a computer device, comprising: a processor, a memory storing machine-readable instructions executable by the processor, and a bus, wherein when the computer device runs, the processor communicates with the memory via the bus, and the machine-readable instructions, when executed by the processor, perform the steps in the first aspect, or in any one of possible embodiments in the first aspect.

In a fourth aspect, the embodiments of the present disclosure further provide a computer-readable storage medium on which a computer program is stored, wherein the computer program, when executed by a processor, performs the steps in the first aspect, or in any one of possible embodiments in the first aspect.

In the embodiments of the present disclosure, first, a review operation of a user on a target book is detected, and book review information of the target book is received; thereafter, it can be determined whether the book review information satisfies a data association requirement of an associated book topic associated with the target book. If it is determined that the data association requirement is satisfied, a book topic associated with the target book can be obtained, and topic reply information of the book topic is determined based on the book review information, enabling association of the book review information with the book topic.

In order to make the aforementioned objects, features and advantages of the present disclosure more comprehensible, preferred embodiments accompanied with the drawings are described in detail below.

BRIEF DESCRIPTION OF THE DRAWINGS

In order to more clearly illustrate the technical solutions of the embodiments of the present disclosure, the drawings required in the embodiments will be briefly described below, and the drawings herein incorporated in and forming a part of the specification illustrate embodiments consistent with the present disclosure and, together with the description, serve to explain the technical solutions of the present disclosure. It is to be understood that the following drawings depict only certain embodiments of the present disclosure and therefore shall not be considered as limiting its scope, and that for those skilled in the art without making any inventive effort, additional related drawings may be derived therefrom.

FIG. 1 depicts a flowchart of a data association method provided in an embodiment of the present disclosure;

FIG. 2 depicts a flowchart of a specific method for determining that the book review information satisfies a data association requirement in the data association method provided in an embodiment of the present disclosure;

FIG. 3 depicts a flowchart of a specific method for determining topic reply information of the book topic based on book review information in the data association method provided in an embodiment of the present disclosure;

FIG. 4 depicts a schematic diagram of the effect of a book reading page provided in an embodiment of the present disclosure;

DETAILED DESCRIPTION

Figures 5, 6:
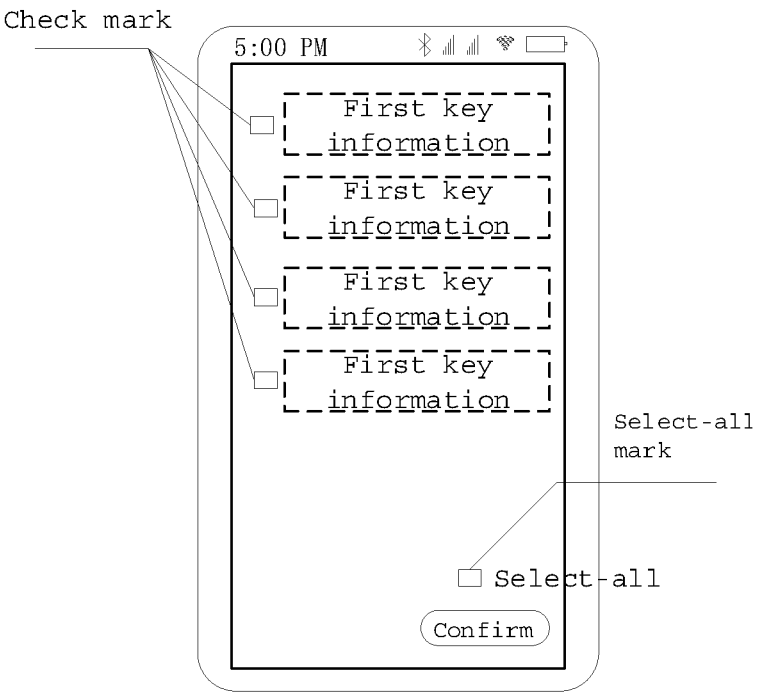
FIG. 5 depicts a schematic diagram of the effect of another book reading page provided in an embodiment of the present disclosure.
FIG. 6 depicts a schematic diagram of the effect of a topic reply page provided in an embodiment of the present disclosure.

To make the objects, technical solutions and advantages of the embodiments of the present disclosure more apparent, the technical solutions in the embodiments of the present disclosure will be described clearly and completely with reference to the drawings in the embodiments of the present disclosure, and it is obvious that the described embodiments are only a part of the embodiments of the present disclosure, not all of the embodiments. The components of the embodiments of the present disclosure, as generally described and illustrated in the drawings herein, could be arranged and designed in a wide variety of different configurations. Thus, the following detailed description of the embodiments of the present disclosure, provided in the accompanying drawings, is not intended to limit the scope of the present disclosure, as claimed, but is merely representative of selected embodiments of the present disclosure. All other embodiments, which can be derived by a person skilled in the art from the embodiments of the present disclosure without making any inventive effort, shall fall within the protection scope of the disclosure.

It should be noted that: like reference numbers and letters refer to like items in the drawings, and thus, once an item is defined in one figure, it need not to be further defined or explained in subsequent figures.

The term "and/or" herein merely describes an associative relationship, meaning that three relationships may exist, e.g., A and/or B, may mean: A exists alone, A and B exist simultaneously, and B exists alone. In addition, the term "at least one" herein means any one of a plurality or any combination of at least two of a plurality, for example, including at least one of A, B, C, and may mean including any one or more elements selected from the group consisting of A, B and C.

Research shows that in existing online reading applications, a topic posting function is usually provided, through which users can post corresponding book topics to implement communication between the users through the book topics, for example, book recommendation topics. For a book topic newly posted by a user, the number of replies to it is usually small. This results in that the user who posted the book topic cannot get aware of relevant content in a timely manner, which degrades the user's experience of using a review function in the applications. Meanwhile, it is also unfavorable for the exchange and communication between the user who posted the book topic and other users.

Based on the above research, the present disclosure provides a data association method and apparatus, a computer device, and a storage medium. In the embodiments of the present disclosure, first, a review operation of a user on a target book is detected, and book review information of the target book is received; thereafter, it can be determined whether the book review information satisfies a data association requirement of an associated book topic associated with the target book. If it is determined that the data association requirement is satisfied, a book topic associated with the target book can be obtained, and topic reply information of the book topic is determined based on the book review information, enabling association of the book review information with the book topic.

By means of the processing described above, an associative relationship between the book review information and the corresponding book topic can be established, so that the reply rate of the book topic can be increased, and meanwhile, the association between the book review information and the book topic can be enhanced, thereby enhancing the exchange and communication between users to improve their reading experience.

To facilitate understanding of the embodiments, first, a data association method disclosed in an embodiment of the present disclosure is described in detail. The subject executing the data association method provided in the embodiment of the present disclosure is generally a computer device with certain computing capabilities, and the computer device comprises, for example: a terminal device or a server or other processing device. In some possible embodiments, the data association method can be implemented by a processor calling computer readable instructions stored in a memory.

Embodiment 1

Referring to FIG. 1, a flowchart of a data association method provided in an embodiment of the present disclosure is shown, the method comprising steps S101 to S105, wherein:

S101: in response to a review operation, receiving book review information of a target book.

In the embodiment of the present disclosure, a review operation of a user on a target book can be detected, and after detecting the review operation, the user's book review information on the target book can be determined.

Here, the book review information may include review content and a review identification, wherein the review identification is used to indicate a review position for the target book and to indicate a favorable rating for the target book, which may be, for example, a five-star rating, and the review position may be Chapter X of the target book or the entire content of the target book.

Here, the book review information may be various types of information such as text type information, video type information, or audio type information, and the specific information type of the book review information is not particularly limited.

S103: upon determining that the book review information satisfies a data association requirement, obtaining a book topic associated with the target book; wherein topic content of the book topic includes information matching the book review information and/or a book attribute feature of the target book.

Here, the data association requirement may be understood as a requirement for associating the book review information with a relevant book topic of the target book, wherein the data association requirement can be understood as a review requirement for the book review information, wherein the review requirement corresponds to at least one review dimension. That is, the corresponding review requirement can be set from the at least one review dimension.

After that, it can be determined whether the book review information satisfies the review requirement described above, wherein if it is determined that the review requirement is satisfied, it can be determined that the book review information satisfies the data association requirement.

After it is determined that the data association requirement is satisfied, a book topic associated with the target book can be obtained; wherein the associated book topic is a topic matching a review feature of the book review information and/or a book attribute feature of the target book, which is screened out of all book topics.

Here, the book attribute feature may include at least one of: chapters of the book, genre of the book, name of the book, characters in the book, author of the book, plot of the book, and other attribute features. The review feature may include at least one of: a plot feature, a character feature, an author feature, and the like.

For example, the book topic associated with the target book may be a topic of a book of the same genre as the target book; may also be a topic containing the target book (or containing the book of the same genre as the target book); or may be a topic of other books with the same plot as the target book, which will not be enumerated here.

S105: determining topic reply information of the book topic based on the book review information.

In the embodiment of the present disclosure, after obtaining the book topic, the book review information can be regarded as topic reply information of the book topic.

Here, the number of the book topics may be multiple, and in this case, the book review information may be determined as topic reply information of each book topic, thereby implementing batch replies to the topics to improve the reply efficiency of the topics.

In the embodiment of the present disclosure, first, a review operation of a user on a target book is detected, and book review information of the target book is received; thereafter, it can be determined whether the book review information satisfies a data association requirement of an associated book topic associated with the target book. If it is determined that the data association requirement is satisfied, a book topic associated with the target book can be obtained, and topic reply information of the book topic is determined based on the book review information, enabling association of the book review information with the book topic.

By means of the processing described above, an associative relationship between book review information and the corresponding book topic can be established, so that the reply rate of the book topic can be increased, and meanwhile, the association between the book review information and the book topic can be enhanced, thereby enhancing the exchange and communication between users to improve their reading experience.

As can be seen from the above description, in the embodiment of the present disclosure, first, a user's review operation for a target book on a book reading page can be detected, and then, the user's book review information for the target book can be received.

Here, the corresponding review trigger flag can be set at a designated position of a target book, for example, the review trigger flag can be set at the end of each chapter of the target book. After detecting the user's trigger operation on the review trigger flag, it is determined that the review operation on the target book is detected. Next, a target input window can be presented in the current interface. The user can input book review information for the target book in a target input window. At this time, the book review information input by the user in the target input window can be received.

After receiving the book review information, it can be determined whether the book review information satisfies a data association requirement, wherein if it is determined that the data association requirement is satisfied, a book topic associated with the target book can be obtained.

In the embodiment of the present disclosure, as shown in FIG. 2, it can be determined that the book review information satisfies the data association requirement in the following manner, which specifically comprises the steps as follows:

Step S201: determining evaluation key information in the book review information; wherein the evaluation key information includes text type information and/or identification type information;

Step S202: in a case where the evaluation key information satisfies a review requirement corresponding to at least one review dimension, determining that the book review information satisfies the data association requirement; wherein the review dimension includes at least one of: a review quality, a review object and a review view count.

Here, the book review information includes text type review content and a review identification, and at this time, a target review identification associated with a review dimension can be extracted from the review identification, and key text information can be extracted from the text type review content. And then, the key text information and/or the target review identification are determined as evaluation key information.

In an optional embodiment, word segmentation processing can be performed on the review content, so as to obtain a plurality of initial phrases; then, filtering processing can be performed on the plurality of initial phrases to obtain a target phrase, for example, duplicate phrases, useless phrases, etc. in the plurality of initial phrases can be deleted. Subsequently, the target phrase can be determined as key text information.

In the embodiment of the present disclosure, at least one review requirement can be set in advance, wherein each review requirement corresponds to one review dimension.

Based on this, in an optional embodiment, evaluation key information can be extracted from the review content and/or the review identification of the book review information according to at least one review dimension, so as to obtain text type information (e.g., key text information) and/or identification type information (e.g., a target review identification).

Here, the review dimension may include at least one of: a review quality, a review object and a review view count; wherein the review quality is used to indicate a favorable rating of the target book; the review object is used to indicate a review content type in the book review information, such as a character type review, a plot type review, an author type review and the like; the review view count is used to indicate the number of times the book review information having been viewed.

Assuming that the review dimension is a review quality, a favorable rating review identification associated with the review quality is determined in the review identification of the book review information, and then the favorable rating review identification is determined as a target review identification, wherein the favorable rating review identification can be a star rating identification, for example, the favorable rating of the target book can be reflected by the star rating identification, where the more five-pointed stars, the higher the favorable rating.

Assuming also that the review dimension is a review view count, a view count identification matching the review view count can be determined in the review identification of the book review information, and then the view count identification is determined as a target review identification.

Assuming also that the review dimension is a review object, at this time, information associated with the review object can be extracted from the book review information, and the associated information can be determined as key text information.

After determining the evaluation key information, it can be determined whether the evaluation key information satisfies the corresponding review requirement, wherein if it is determined that the corresponding review requirement is satisfied, it is determined that the book review information satisfies the data association requirement.

In specific implementation, it can be determined whether text key information in the evaluation key information satisfies the corresponding review requirement, and it can be determined whether a target review identification in the evaluation key information satisfies the corresponding review requirement, wherein if it is determined that the corresponding review requirement is satisfied, it is determined that the data association requirement is satisfied.

In the embodiment, by setting the review requirement corresponding to at least one review dimension, screening of book review information can be implemented, so that the book review information that satisfies the requirement is regarded as a reply to the book topic.

In the embodiment of the present disclosure, upon determining that the book review information satisfies the data association requirement, a topic obtaining request can be sent to a server. After obtaining the topic obtaining request, the server can send a book topic associated with the target book to the client.

Here, the server can determine a book topic associated with the target book among candidate recommended topics after obtaining the topic obtaining request; alternatively, the server can determine a book topic associated with the target book among all book topics before obtaining the topic obtaining request.

In an optional embodiment, the book topic associated with the target book can be determined in the following manner, which specifically comprises the steps as follows:

Step S301: extracting second key information from topic related information of a candidate recommended topic, the second key information being used to indicate a book attribute feature of a book associated with the candidate recommended topic;

Step S302: determining second key information matching the book attribute feature and/or a review feature of the book review information, the review feature including a feature corresponding to at least one book attribute dimension;

Step S303: determining the book topic based on a candidate recommended topic corresponding to the matching second key information.

In the embodiment of the present disclosure, first, the second key information can be extracted from the topic related information of the candidate recommended topic, wherein the topic related information may include at least one of: topic content, historical topic replies of the candidate recommended topic, and a topic tag.

Here, the topic tag may be used as at least one of: a category tag of the candidate recommended topic and an associated object tag of the candidate recommended topic, wherein the associated object can be understood as an object corresponding to a book associated with the candidate recommended topic. For example, the associated object may be at least one of: a book associated with the candidate recommended topic, a character in the book associated with the candidate recommended topic, the author of the book associated with the candidate recommended topic, a chapter of the book associated with the candidate recommended topic, the plot of the book associated with the candidate recommended topic, and the like.

In the embodiment of the present disclosure, the second key information used to indicate a book attribute feature of the book associated with the candidate recommended topic can be extracted from the topic related information described above.

The second key information includes sub key information corresponding to a plurality of book attribute features, wherein the book attribute features may include at least one of: chapters of the book, genre of the book, name of the book, characters in the book, author of the book, plot of the book, and the like.

For example, the second key information may include the following sub key information: chapter information (e.g., Chapter N) of the book associated with the candidate recommended topic, genre information (e.g., urban) of the book associated with the candidate recommended topic, name information of the book associated with the candidate recommended topic, character information of the book associated with the candidate recommended topic, author information of the book associated with the candidate recommended topic, plot information of the book associated with the candidate recommended topic, and the like.

For a plurality of candidate recommended topics, a plurality of pieces of second key information can be determined. Based on this, second key information that matches a book attribute feature and/or a review feature of the book review information of the target book can be determined among the plurality of pieces of second key information, so that a book topic is determined based on the candidate recommended topic corresponding to the matching second key information.

Here, the review feature corresponds to at least one of the following book attribute dimensions: a book plot dimension, a book character dimension, an author dimension, a book reading amount dimension, a book chapter dimension, and the like.

In an optional embodiment, a degree of association between each piece of second key information and a book attribute feature and/or a review feature can be determined, so that a degree of matching between the second key information and the book attribute feature and/or the review feature is determined based on the degree of association, wherein when the degree of matching meets a matching requirement, the second key information is determined as second key information that matches the book attribute feature and/or the review feature. Here, a degree of sub association between each piece of sub key information in the second key information and the book attribute feature and/or the review feature can be calculated, and thereafter, a plurality of degrees of sub association can be weighted and summed to obtain the degree of association of the second key information.

In another optional embodiment, the second key information including the same information as the book attribute feature and/or the review feature can be determined as the matching second key information.

For example, the review feature of the book review information of the target book is a plot feature. Based on this, a candidate recommended topic matching the review feature (e.g., plot feature) of the target book can be screened out from the candidate recommended topics based on the second key information, so that the matching candidate recommended topic screened out for the second time is determined as the book topic.

After determining the matching second key information, a book topic associated with the target book can be determined among the candidate recommended topics corresponding to the matching second key information.

In this embodiment of the present disclosure, if the book review information includes a book review position of the target book, the step S303 of determining the book topic based on a candidate recommended topic corresponding to the matching second key information specifically comprises the following steps:

Step S3031: determining at least one target candidate recommended topic among the candidate recommended topics corresponding to the matching second key information; wherein a book associated with each of the target candidate recommended topics matches the target book;

Step S3032: determining position key information in second key information of the target candidate recommended topic; wherein the position key information is used to indicate a recommended chapter of a book associated with the target candidate recommended topic;

Step S3033: determining, as the book topic, the target candidate recommended topic corresponding to the position key information that matches the book review position.

According to the foregoing description, the book review information may carry a book review position of the target book. That is, the book review information may be relevant review information of a user about a target chapter in a target book, wherein the target chapter is a chapter corresponding to the book review position.

In order to determine a candidate recommended topic that is more matching with the book review information among the candidate recommended topics corresponding to the matching second key information, the candidate recommended topics can be further screened based on the review position, so as to obtain a book topic associated with the target book.

In the embodiment of the present disclosure, first, a book associated with the candidate recommended topic corresponding to the matching second key information can be determined, so as to obtain a plurality of books. Then, a book matching the target book is determined among the plurality of books, that is, a book identical to the target book can be determined among the plurality of books, and a candidate recommended topic corresponding to the book is determined, which is a target candidate recommended topic; wherein the number of the target candidate recommended topics may be one or more.

Subsequently, position key information can be extracted from the second key information, wherein the position key information may be a recommended chapter of a book associated with the target candidate recommended topic (e.g., Chapter M of XX book), or may be other position information that can be used to indicate the recommended chapter (e.g., page P of XX book, a chapter updated by the author on a certain day of a certain month in a certain year, a chapter of XX book in which character YY appears for the first time, a chapter of XX book about plot "AA").

After the position key information is determined, the position key information matching the book review position can be determined in the position key information. For example, position key information of the same chapter corresponding to the book review position can be determined, so that the corresponding target candidate recommended book topic is determined based on the position key information.

For example, first, a candidate recommended topic matching the target book (or the genre of the target book) can be screened out from the candidate recommended topics based on the second key information. At this time, the book associated with the matching candidate recommended topic is a target book, or is other book of the same genre as the target book. If the book associated with the matching candidate recommended topic is the target book, the candidate recommended topic matching the review position corresponding to the book review information can be screened out from the matching candidate recommended topics based on the second key information, so that the matching candidate recommended topic screened out for the second time is determined as the book topic.

By means of the processing described above, a book topic more matching the book review information can be screened out, and the more matching reply content can be determined for the topic content of the book topic based on the book review information, and therefore the user's use experience can be improved.

In the embodiment of the present disclosure, after determining the book topic associated with the target book as described above, the step of determining topic reply information of the book topic based on the book review information can be performed, and as shown in FIG. 3, the step S105 specifically comprises the following steps:

Step S1051: obtaining first key information of each of the book topics, and displaying the first key information; wherein the first key information includes a matching feature with the book review information and/or the book attribute feature respectively;

Step S1052: determining, in response to a trigger operation on the first key information, the topic reply information of the book topic based on the book review information.

In the embodiment of the present disclosure, in a case where it is determined that the book review information satisfies a data association requirement, as shown in FIG. 4, a prompt popup window can be displayed on a book reading page, wherein the prompt popup window may include prompt information, e.g., "Whether to be associated with book topic", which is used to prompt a user whether to release specific book review content of the book review information as topic reply information of the book topic.

After detecting the user's confirming operation on the prompt information, a topic obtaining request can be sent to a server, and thereafter, the server can determine a book topic associated with a target book in the manner described above.

In an optional embodiment, the server can extract first key information from topic content of a book topic and feed back the first key information to the client. After obtaining the first key information, the client can display the first key information.

In another optional embodiment, the server can feed back a book topic associated with a target book to the client. Thereafter, the client can extract first key information from topic content of the book topic and display the first key information.

Here, the first key information can be extracted from the topical content of the book topic based on the review feature and/or the book attribute feature of the book review information. Thereafter, a target display page can be presented, in which the first key information is displayed on the target display page. For example, a skip can be made to a display intermediate page (i.e., the target display page), on which the first key information is displayed.

After detecting the user's trigger operation on the first key information, the book review information can be determined as topic reply information of the book topic.

Here, if the number of book topics is multiple, corresponding first key information can be determined for each book topic, and at this time, a plurality of pieces of first key information can be displayed. In order to implement batch replies to the book topics, as shown in FIG. 5, a corresponding check mark and/or a select-all mark can be set for each piece of first key information.

Through the check mark, screening of multiple book topics can be implemented, so that the book topics to which the user wants to reply can be screened out from the multiple book topics for batch replying. Through the select-all mark, one-key reply to the multiple book topics can be implemented, so that the reply flow of the multiple book topics is simplified, thereby simplifying the user's reply operation on the book topics and improving the reply efficiency.

In an optional embodiment, the step S1052 of determining, in response to a trigger operation on the first key information, the topic reply information of the book topic based on the book review information specifically comprises the following steps:

Step S11: in response to a click operation on the first key information, displaying a topic reply page of the book topic, and displaying the book review information in a reply area of the topic reply page;

Step S12: determining, in response to a confirming operation on the book review information, the book review information as the topic reply information of the target book topic.

In the embodiment of the present disclosure, after detecting the user's click operation on any one of a plurality of pieces of first key information, as shown in FIG. 6, a skip can be made to a topic reply page displaying a book topic, wherein the topic reply page includes a reply area, in which book review information and a "confirm" mark can be displayed.

Here, the book review information displayed in the reply area is in a modifiable state, that is, the user can edit and modify the book review information displayed in the reply area.

If the user's trigger operation on the "confirm" mark is detected, it is determined that a confirming operation on the book review information is detected, and at this time, the book review information can be determined as the topic reply information of the target book topic.

By means of the processing described above, a preview function and a modifying function of the book review information can be implemented, and through the preview function and the modifying function, more matching reply information can be determined for each book topic based on the book review information.

On the basis of the embodiment shown in FIG. 3, the method provided in the embodiment of the present disclosure further comprises the following steps:

Step S21: in response to a trigger operation on a list identification on a target display page, obtaining a target topic list; wherein the target display page is a page displaying the first key information, and the book topic is part of the book topics in the target topic list;

Step S22: displaying the target topic list on the target display page.

In the embodiment of the present disclosure, a list identification can also be displayed on the target display page, and by triggering the list identification, a topic list where the book topic is, i.e., a target topic list, can be obtained, and the target topic list is displayed on the target display page. Here, the book topics in the target topic list can be understood as other book topics associated with the target book.

If the server feeds back a large number of all book topics to the client, part of the book topics can be displayed on the target display page, and a list identification is displayed. By triggering the list identification, display can be performed on the target display page, and first key information of the book topic in the target topic list is displayed on the target display page in a scrolling manner.

Next, the user's click operation on the first key information of the book topic in the target topic list can be detected, and after detecting the click operation, the steps S11 and S12 described above can be performed.

By means of the processing described above, the book topic to be associated can be selected for the user more flexibly. For example, it is possible to automatically match the book topic associated with the target book for the user; in addition, if the user wants to release the book review information to other book topics, more book topics can be obtained by triggering the list identification, so that the book review information is released to other book topics.

In an optional embodiment, the step S105 of determining topic reply information of the book topic based on the book review information specifically comprises the following steps:

First, in the case where the number of the book topics is multiple, topic popularity information of each of the book topics is obtained;

Thereafter, a book topic that satisfies a reply requirement is determined among a plurality of the book topics based on the topic popularity information, and topic reply information is determined for the book topic that satisfies the reply requirement based on the book review information.

In the embodiment of the present disclosure, if the number of the obtained book topics associated with the target book is multiple, books associated with all the book topics can be alternative book topics for the target book; thereafter, the topic popularity of each alternative book topic can be determined, and multiple alternative book topics are sorted based on the topic popularity; and the first N alternative book topics with the highest popularity are determined among the multiple alternative book topics as first book topics based on the sorting result, and topic reply information of the first book topics is determined based on the book review information.

In addition, second book topics that have not yet been replied to can be determined among all the book topics, and thereafter, topic reply information of the second book topics can be determined based on the book review information.

By means of the processing described above, the association between the book review information and the book topic can be enhanced, so that the exchange and communication between users are enhanced, thereby improving the reading experience of the users.

It will be understood by those skilled in the art that in the above method of the present embodiment, the order in which the steps are drafted does not imply a strict order of execution and does not impose any limitations on the implementation, as the order of execution of the steps should be determined by their functions and possibly inherent logic.

Based on the same inventive concept, the embodiments of the present disclosure further provide a data association apparatus corresponding to the data association method, and as the principle of solving the problem by the apparatus in the embodiments of the present disclosure is similar to the data association method in the embodiments of the present disclosure, the implementation of the apparatus may refer to the implementation of the method, and the description thereof will not be repeated.

Figures 7, 8:
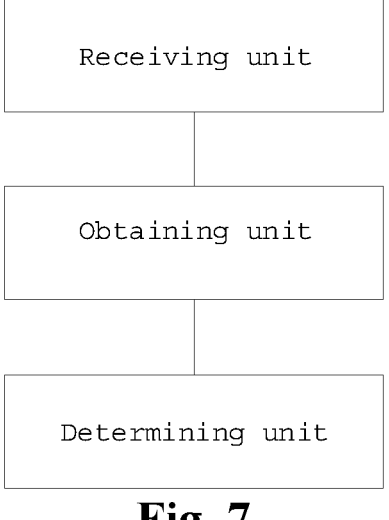
FIG. 7 depicts a schematic diagram of a data association apparatus provided in an embodiment of the present disclosure.
FIG. 8 depicts a schematic diagram of a computer device provided in an embodiment of the present disclosure.

Referring to FIG. 7, a schematic diagram of a data association apparatus provided in an embodiment of the present disclosure is shown, the apparatus comprising: a receiving unit 10, an obtaining unit 20, and a determining unit 30; wherein the receiving unit 10 is used for receiving book review information of a target book in response to a review operation;

the obtaining unit 20 is used for obtaining a book topic associated with the target book upon determining that the book review information satisfies a data association requirement; wherein topic content of the book topic includes information matching the book review information and/or a book attribute feature of the target book;

the determining unit 30 is used for determining topic reply information of the book topic based on the book review information.

In the embodiment of the present disclosure, first, a review operation of a user on a target book is detected, and book review information of the target book is received; thereafter, it can be determined whether the book review information satisfies a data association requirement of an associated book topic associated with the target book. If it is determined that the data association requirement is satisfied, a book topic associated with the target book can be obtained, and topic reply information of the book topic is determined based on the book review information, enabling association of the book review information with the book topic.

By means of the processing described above, an associative relationship between the book review information and the corresponding book topic can be established, so that the reply rate of the book topic can be increased, and meanwhile, the association between the book review information and the book topic can be enhanced, thereby enhancing the exchange and communication between users to improve their reading experience.

In one possible embodiment, the apparatus is further used for: determining evaluation key information in the book review information; wherein the evaluation key information includes text type information and/or identification type information; in a case where the evaluation key satisfies information a review requirement corresponding to at least one review dimension, determining that the book review information satisfies the data association requirement; wherein the review dimension includes at least one of: a review quality, a review object and a review view count.

In one possible embodiment, the determining unit is used for: obtaining first key information of each of the book topics, and displaying the first key information; wherein the first key information includes a matching feature with the book review information and/or the book attribute feature respectively; determining, in response to a trigger operation on the first key information, the topic reply information of the book topic based on the book review information.

In one possible embodiment, the determining unit is used for: in response to a click operation on the first key information, displaying a topic reply page of the book topic, and displaying the book review information in a reply area of the topic reply page; and determining, in response to a confirming operation on the book review information, the book review information as the topic reply information of the target book topic.

In one possible embodiment, the apparatus is further used for: in response to a trigger operation on a list identification on a target display page, obtaining a target topic list; wherein the target display page is a page displaying the first key information, and the book topic is part of book topics in the target topic list; and displaying the target topic list on the target display page.

In one possible embodiment, the determining unit is used for: in a case where the number of the book topics is multiple, obtaining topic popularity information of each of the book topics; determining a book topic that satisfies a reply requirement among the multiple book topics based on the topic popularity information, and determining topic reply information for the book topic that satisfies the reply requirement based on the book review information.

In one possible embodiment, the apparatus is further used for: extracting second key information from topic related information of a candidate recommended topic, the second key information being used to indicate a book attribute feature of a book associated with the candidate recommended topic; determining second key information matching the book attribute feature and/or a review feature of the book review information, the review feature including a feature corresponding to at least one book attribute dimension; and determining the book topic based on the candidate recommended topic corresponding to the matching second key information.

In one possible embodiment, the apparatus is further used for: in the case where the book review information includes a book review position of the target book, determining at least one target candidate recommended topic among the candidate recommended topics corresponding to the matching second key information; wherein a book associated with each of the target candidate recommended topics matches the target book; determining position key information in second key information of the target candidate recommended topic; wherein the position key information is used to indicate a recommended chapter of a book associated with the target candidate recommended topic; and determining, as the book topic, the target candidate recommended topic corresponding to the position key information that matches the book review position.

The description of the processing flow of each unit in the apparatus and the interaction flow between the units may refer to the related description in the above method embodiments, and will not be described in detail here.

Corresponding to the data association method in FIG. 1, the embodiments of the present disclosure further provide a computer device 800. As shown in FIG. 8, which is a schematic structural diagram of the computer device 800 provided in the embodiment of the present disclosure, the computer device 800 comprises:

a processor 81, a memory 82, and a bus 83; wherein the memory 82 is used for storing execution instructions and includes an internal memory 821 and an external memory 822; the internal memory 821, also known as the memory, is used for temporarily storing operation data in the processor 81 and data exchanged with the external memory 822 such as a hard disk, the processor 81 performs data exchange with the external memory 822 through the internal memory 821, and when the computer device 800 runs, the processor 81 communicates with the memory 82 through the bus 83, causing the processor 81 to execute the following instructions:

in response to a review operation, receiving book review information of a target book;

upon determining that the book review information satisfies a data association requirement, obtaining a book topic associated with the target book; wherein topic content of the book topic includes information matching the book review information and/or a book attribute feature of the target book; and determining topic reply information of the book topic based on the book review information.

Embodiments of the present disclosure also provide a computer-readable storage medium, on which a computer program is stored, wherein the computer program, when executed by a processor, performs the steps of the data association method described in the above method embodiments; wherein the storage medium may be a volatile or non-volatile computer-readable storage medium.

Embodiments of the present disclosure further provide a computer program product which carries program codes, wherein instructions included in the program codes can be used to perform the steps of the data association method in the above method embodiments. For details, please refer to the above method embodiments, which are not described herein again.

Herein, the computer program product can be specifically implemented by hardware, software or the combination thereof. In an optional embodiment, the computer program product is specifically embodied as a computer storage medium, and in another optional embodiment, the computer program product is specifically embodied as a software product, such as a Software Development Kit (SDK) or the like.

It can be clearly understood by those skilled in the art that, for convenience and simplicity of description, the specific working process of the system and the apparatus described above may refer to the corresponding process in the above method embodiments, and details thereof are not described herein again. In the embodiments provided in the present disclosure, it should be understood that the disclosed system, apparatus and method may be implemented in other ways. The above-described apparatus embodiments are merely illustrative, and for example, the division of the units is only one type of logical function, and may be implemented in other ways, and for example, multiple units or components may be combined or integrated into another system, or some features may be omitted, or not performed. In addition, the shown or discussed coupling or direct coupling or communicative connection between each other may be through some communication interfaces, indirect coupling or communicative connection between devices or units, and may be in an electrical, mechanical or other form.

The units described as separate parts may or may not be physically separate, and parts displayed as units may or may not be physical units, may be located in one position, or may be distributed on multiple network units. Some or all of the units can be selected according to actual needs to achieve the purpose of the solution of the embodiment.

In addition, functional units in the embodiments of the present disclosure may be integrated into one processing unit, or each unit may exist alone physically, or two or more units are integrated into one unit.

The functions, if implemented in software functional units and sold or used as a stand-alone product, may be stored in a non-transitory computer-readable storage medium executable by a processor. Based on such understanding, the technical solutions of the present disclosure, essentially or the part thereof contributing to the prior art, may be embodied in the form of a software product, which is stored in a storage medium and includes instructions for causing a computer device (which may be a personal computer, a server, or a network device) to execute all or part of the steps of the methods described in the embodiments of the present disclosure. And the aforementioned storage medium includes: a USB flash disk, a removable hard disk, a Read-Only Memory (ROM), a Random Access Memory (RAM), a magnetic disk, an optical disk, or various other media capable of storing program codes.

Finally, it should be noted that: the above-mentioned embodiments are merely specific embodiments of the present disclosure, which are used to illustrate the technical solutions of the present disclosure, but not to limit the technical solutions, and the scope of the present disclosure is not limited thereto. Although the present disclosure is described in detail with reference to the foregoing embodiments, those skilled in the art should understand that: those skilled in the art can still make modifications or changes to the technical solutions recited in the foregoing embodiments, or make equivalent substitutions for some of the technical features, within the technical scope of the disclosure; such modifications, changes and substitutions do not cause the essence of the corresponding technical solutions to depart from the spirit and scope of the technical solutions in the embodiments disclosed herein, and they should be construed as being included therein. Therefore, the protection scope of the present disclosure shall be subject to the protection scope of the claims.

What is claimed is:

1. A data association method, comprising:
in response to a review operation, receiving book review information of a target book;
upon determining that the book review information satisfies a data association requirement, obtaining a book topic associated with the target book, wherein the data association requirement is a requirement for associating the book review information with the book topic of the target book; wherein a topic content of the book topic comprises information matching the book review information and/or a book attribute feature of the target book; and
determining the book review information satisfying the data association requirement topic as reply information of the book topic, wherein in a case where the number of the book topics is multiple, the book review information satisfying the data association requirement is determined as topic reply information of each book topic.

2. The method according to claim 1, wherein the determining that the book review information satisfies a data association requirement comprises:
determining evaluation key information in the book review information; wherein the evaluation key information comprises text type information and/or identification type information;
in a case where the evaluation key information satisfies a review requirement corresponding to at least one review dimension, determining that the book review information satisfies the data association requirement; wherein the review dimension comprises at least one of: a review quality, a review object and a review view count.

3. The method according to claim 1, wherein the determining topic reply information of the book topic based on the book review information comprises:

obtaining first key information of each of the book topics, and displaying the first key information; wherein the first key information comprises a matching feature with the book review information and/or the book attribute feature respectively;
determining, in response to a trigger operation on the first key information, the topic reply information of the book topic based on the book review information.

4. The method according to claim 3, wherein the determining, in response to a trigger operation on the first key information, the topic reply information of the book topic based on the book review information comprises:
in response to a click operation on the first key information, displaying a topic reply page of the book topic, and displaying the book review information in a reply area of the topic reply page;
determining, in response to a confirming operation on the book review information, the book review information as the topic reply information of the target book topic.

5. The method according to claim 3, further comprising:
in response to a trigger operation on a list identification on a target display page, obtaining a target topic list; wherein the target display page is a page displaying the first key information, and the book topic is part of book topics in the target topic list; and
displaying the target topic list on the target display page.

6. The method according to claim 1, wherein the determining topic reply information of the book topic based on the book review information comprises:
in a case where the number of the book topics is multiple, obtaining topic popularity information of each of the book topics;
determining a book topic that satisfies a reply requirement among the multiple book topics based on the topic popularity information, and determining topic reply information for the book topic that satisfies the reply requirement based on the book review information.

7. The method according to claim 1, wherein the method further determines the book topic by:
extracting second key information from topic related information of a candidate recommended topic, the second key information being used to indicate a book attribute feature of a book associated with the candidate recommended topic;
determining second key information matching the book attribute feature and/or a review feature of the book review information, the review feature including a feature corresponding to at least one book attribute dimension; and
determining the book topic based on the candidate recommended topic corresponding to the matching second key information.

8. The method according to claim 7, wherein the book review information comprises a book review position of the target book; the determining the book topic based on a candidate recommended topic corresponding to the matching second key information comprises:
determining at least one target candidate recommended topic among the candidate recommended topics corresponding to the matching second key information; wherein a book associated with each of the target candidate recommended topics matches the target book;
determining position key information in the second key information of the target candidate recommended topic; wherein the position key information is used to indicate a recommended chapter of a book associated with the target candidate recommended topic;

determining, as the book topic, the target candidate recommended topic corresponding to the position key information that matches the book review position.

9. A computer device, comprising:

a processor, a memory storing machine-readable instructions executable by the processor, and a bus, wherein when the computer device runs, the processor communicates with the memory via the bus, and the machine-readable instructions, when executed by the processor, cause the processor to:

in response to a review operation, receive book review information of a target book;

upon determining that the book review information satisfies a data association requirement, obtain a book topic associated with the target book, wherein the data association requirement is a requirement for associating the book review information with the book topic of the target book; wherein a topic content of the book topic comprises information matching the book review information and/or a book attribute feature of the target book; and determine the book review information satisfying the data association requirement as topic reply information of the book topic, wherein in a case where the number of the book topics is multiple, the book review information satisfying the data association requirement is determined as topic reply information of each book topic.

10. The computer device according to claim 9, wherein the instructions for determining that the book review information satisfies a data association requirement further causes the processor to:

determine evaluation key information in the book review information; wherein the evaluation key information comprises text type information and/or identification type information;

in a case where the evaluation key information satisfies a review requirement corresponding to at least one review dimension, determine that the book review information satisfies the data association requirement; wherein the review dimension comprises at least one of: a review quality, a review object and a review view count.

11. The computer device according to claim 9, wherein the instructions for determining topic reply information of the book topic based on the book review information further causes the processor to:

obtain first key information of each of the book topics, and displaying the first key information; wherein the first key information comprises a matching feature with the book review information and/or the book attribute feature respectively;

determine, in response to a trigger operation on the first key information, the topic reply information of the book topic based on the book review information.

12. The computer device according to claim 11, wherein the instructions for determining, in response to a trigger operation on the first key information, the topic reply information of the book topic based on the book review information further causes the processor to:

in response to a click operation on the first key information, display a topic reply page of the book topic, and displaying the book review information in a reply area of the topic reply page;

determine, in response to a confirming operation on the book review information, the book review information as the topic reply information of the target book topic.

13. The computer device according to claim 11, further comprising instructions that causes the processor to:

in response to a trigger operation on a list identification on a target display page, obtain a target topic list; wherein the target display page is a page displaying the first key information, and the book topic is part of book topics in the target topic list; and display the target topic list on the target display page.

14. The computer device according to claim 9, wherein the instructions for determining topic reply information of the book topic based on the book review information further causes the processor to:

in a case where the number of the book topics is multiple, obtain topic popularity information of each of the book topics;

determine a book topic that satisfies a reply requirement among the multiple book topics based on the topic popularity information, and determine topic reply information for the book topic that satisfies the reply requirement based on the book review information.

15. The computer device according to claim 9, further comprising instructions that causes the processor to determine the book topic by:

extracting second key information from topic related information of a candidate recommended topic, the second key information being used to indicate a book attribute feature of a book associated with the candidate recommended topic;

determining second key information matching the book attribute feature and/or a review feature of the book review information, the review feature including a feature corresponding to at least one book attribute dimension; and determining the book topic based on the candidate recommended topic corresponding to the matching second key information.

16. The computer device according to claim 15, wherein the book review information comprises a book review position of the target book; the instructions for determining the book topic based on a candidate recommended topic corresponding to the matching second key information further causes the processor to:

determine at least one target candidate recommended topic among the candidate recommended topics corresponding to the matching second key information; wherein a book associated with each of the target candidate recommended topics matches the target book;

determine position key information in the second key information of the target candidate recommended topic; wherein the position key information is used to indicate a recommended chapter of a book associated with the target candidate recommended topic;

determine, as the book topic, the target candidate recommended topic corresponding to the position key information that matches the book review position.

17. A non-transitory computer-readable storage medium, having computer program instructions stored thereon, the computer program instructions, when executed by a processor, cause the processor to:

in response to a review operation, receive book review information of a target book;

upon determining that the book review information satisfies a data association requirement, obtain a book topic associated with the target book, wherein the data association requirement is a requirement for associating the book review information with the book topic of the target book; wherein a topic content of the book topic comprises information matching the book review information and/or a book attribute feature of the target book; and determine the book review information satisfying the data association requirement as topic reply information of the book topic, wherein in a case where the number of the book topics is multiple, the book review information satisfying the data association requirement is determined as topic reply information of each book topic.

18. The non-transitory computer-readable storage medium according to claim 17, wherein the instructions for determining that the book review information satisfies a data association requirement further causes the processor to:

determine evaluation key information in the book review information; wherein the evaluation key information comprises text type information and/or identification type information;

in a case where the evaluation key information satisfies a review requirement corresponding to at least one review dimension, determine that the book review information satisfies the data association requirement; wherein the review dimension comprises at least one of: a review quality, a review object and a review view count.

19. The non-transitory computer-readable storage medium according to claim 17, wherein the instructions for determining topic reply information of the book topic based on the book review information further causes the processor to:

obtain first key information of each of the book topics, and displaying the first key information; wherein the first key information comprises a matching feature with the book review information and/or the book attribute feature respectively;

determine, in response to a trigger operation on the first key information, the topic reply information of the book topic based on the book review information.

20. The non-transitory computer-readable storage medium according to claim 17, wherein the instructions for determining topic reply information of the book topic based on the book review information further causes the processor to:

in a case where the number of the book topics is multiple, obtain topic popularity information of each of the book topics;

determine a book topic that satisfies a reply requirement among the multiple book topics based on the topic popularity information, and determine topic reply information for the book topic that satisfies the reply requirement based on the book review information.

\* \* \* \* \*